3,047,718
NEGATIVE ION GENERATOR
David G. Fleming, Cleveland Heights, and Sylvester K. Guth, South Euclid, Ohio, assignors to General Electric Company, a corporation of New York
Filed Nov. 24, 1959, Ser. No. 855,156
6 Claims. (Cl. 250—43)

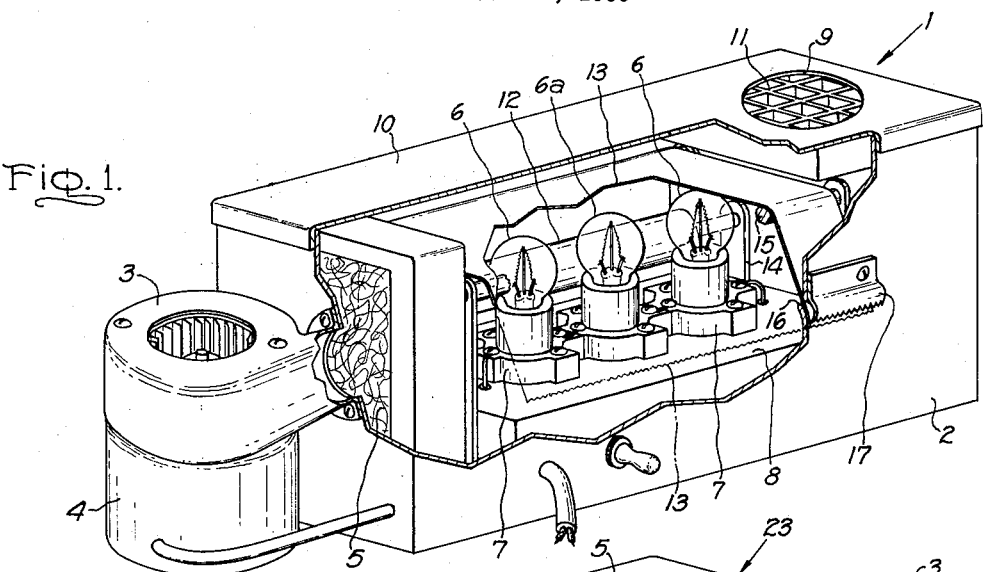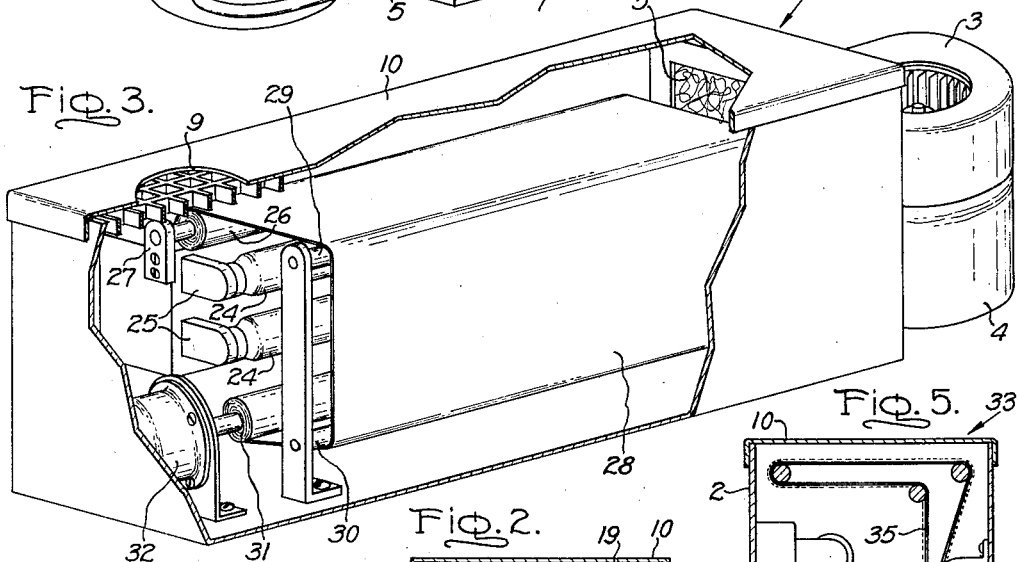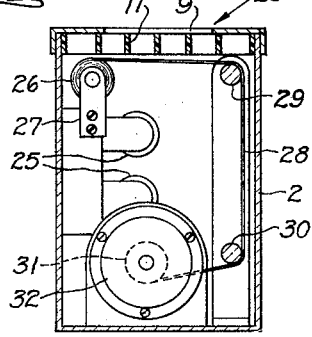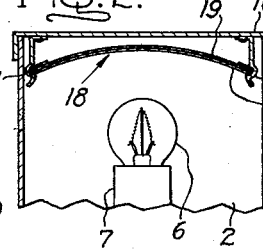
Inventors:
David G. Fleming
Sylvester K. Guth
by Ernest W. Pogue
Their Attorney

This invention relates to negative ion generators and more particularly to sources of negative ions suitable for use in connection with devices for treating or conditioning air. Examples of such devices are air purifiers, evaporative type air coolers, and conventional air conditioners using a heat cycle.

It is well-known that electricity may be conducted through gases by charged particles or gaseous ions. The fundamental unit of charge is the electron which has a unit negative charge and a mass $1/1839$ that of a hydrogen atom. When an electron is expelled from an atom or molecule of a gas, the latter is left with an excess of positive charge and becomes a positive ion. The negative electron attaches itself readily to one of the neutral atoms or molecules by which it is surrounded and thus forms a negative ion. In gaseous electric discharge lamps, the charge carriers more commonly considered are elecrons and positive ions. However both positive and negative ions exist in the atmosphere. They may range in size from one molecule with a single charge to a large particle with multiple charges. Their concentration increases during electric storms or disturbances.

Of late, considerable interest has arisen in the claimed therapeutic effects of negative ions, particularly for the treatment of respiratory ailments. Recently published reports indicate that there well may be some merit to these claims. A considerable number of portable devices have appeared on the market which are offered as sources of negative ions. These devices are sometimes described as electric or electronic air purifiers and generally include an electric fan or blower for forcing air through a filter and a source of germicidal or ultraviolet rays for treating the air.

In some of the air purifiers presently being offered, the air is blown across one or more ozone lamps, that is, electric discharge lamps emitting 1849 A. ultraviolet radiation and capable of ozonizing the surrounding air. Such a lamp, in conjunction with the housing around it, is also a source of negative ions so that an air purifier incorporating such a source produces both ozone and negative ions. Although ozone in minute quantities is useful as a means of odor control, excessive concentrations thereof are now known to be harmful. When ozone lamps are used as a source of negative ions in electric air purifiers, an excessive concentration of ozone may be produced. Particularly is this so where a cluster of such ozone producing lamps is used in order to achieve a high output of negative ions.

Therefore, the general object of this invention is to provide new and improved negative ion generators which are more efficient than those which have been available up to now.

A more specific object of the invention is to provide a negative ion generator or source capable of producing large quantities of negative ions substantially free of ozone or, if desired, containing only a predetermined proportion of ozone.

It is known that the irradiation of a metal by radiation of sufficiently short wave length, that is, its bombardment by photons of sufficiently high energy, will result in the release of electrons by the metal. This effect is known as the photoelectric effect and the released electrons may combine with atmospheric molecules to form negatively charged ions. For each substance there is a definite wave length at which the photoelectric emission commences, rays of wave length longer than the critical value producing no effect. This critical wave length is greater according as the element is more electropositive and shorter as the element becomes more electronegative. For the alkali metals which are extremely electropositive, the maximum or threshold wave length which will excite photoelectricity is actually in the visible spectrum. It might therefore be throught that electrons, and consequently negative ions, may readily be obtained by selecting a metal having a sufficiently low work function and irradiating it with radiation of the appropriate wave length. If the electrons are to be produced in an evacuated enclosure as in a photoelectric cell, this may be the case but it is otherwise when the electrons are to be produced in air. The rate at which electrons escape from the irradiated metal depends on a large number of conditions and particularly on the state of the metal surface. Oxide films and condensed gas films on the surface of the metal retard the escape of the negative electricity. The alkali metals potassium and sodium, and likewise the alkaline earth metals barium, strontium and calcium, oxidize very rapidly in air and for this reason are not suitable. Other metals with relatively low work functions such as magnesium and aluminum are likewise easily oxidized and the surface films thus produced inhibit the electron emission and the resulting negative ion generation. To counter this effect, the practice has been to use more energetic, that is, shorter wave length ultraviolet radiation. It has generally been considered that, as a practical matter, the wave length of the ultraviolet radiation had to be under 2000 A. in order to emit electrons into air and produce negative ions in substantial quantities. The requirement for a wave length under 2000 A. meant in practice that 1849 A. radiation was used, this being the wave length of the ozonizing radiation produced by ozone lamps and resulting from a low pressure discharge through mercury vapor. However a low pressure discharge through mercury vapor produces 2537 A. radiation in greater quantities than 1849 A. and the former is non-ozonizing. Therefore a more specific object of the invention is to provide a practical source of negative ions operating from 2537 A. radiation.

In accordance with the invention, negative ions are produced by irradiating a suitable metallic surface such as a replaceable foil of magnesium or aluminum with 2537 A. radiation. These metals have sufficiently low work functions that they emit electrons in copious quantities when irradiated with 2537 A. ultraviolet radiation. A coating of oxide builds up on the metal foil as it is irradiated and reduces the emission. However the build-up is a gradual process and, in accordance with the invention, the metal foil target is replaced or reactivated either periodically or continuously. At the beginning of an operating cycle, fresh clean foil is located in close proximity to the 2537 A. ultraviolet producing lamp or lamps. This causes the release of electrons and the formation of a cloud of negative ions in proximity to the foil. The cloud of ions is dispersed into the environmental air by the action of a blower sending a stream of air across the metal foil target. An active target surface may be maintained in several ways, for instance by manual periodic replacement of the foil or by an automatic system using for instance a clockwork drive to advance fresh foil or target material before the lamps.

For further objects and advantages and for a better understanding of the invention, attention is now directed to the following description of preferred embodiments thereof and to the accompanying drawing. The features of the invention believed to be novel will be more particularly pointed out in the appended claims.

In the drawing:

FIG. 1 is a pictorial view, partly cut away, of a negative ion generator according to the invention utilizing manual periodic replacement of the target foil material.

FIG. 2 illustrates another arrangement for manual renewal of the target foil.

FIG. 3 is a pictorial view of a negative ion generator embodying the invention and utilizing automatic advance of the target foil material.

FIG. 4 is a cross-sectional view through the negative ion generator of FIG. 2.

FIG. 5 is a cross-sectional view through a negative ion generator utilizing automatic advance and continuous reprocessing of the target material.

Referring to FIG. 1, the invention is shown embodied in an air purifier 1 comprising a box-like housing 2 on one end of which is mounted an air impeller or blower 3 driven by an electric motor 4. The air is forced through a filter 5 which may be of a glass fiber type for removing dust and pollen. Within the housing, a cluster, three in the illustration, of 2537 A. ultraviolet producing lamps 6 are located in sockets 7 mounted on a platform 8. The air is blown through the housing about the lamps and escapes through aperture 9 in coverplate 10. A louver or grid-like baffle 11 is located under the aperture to shield the lamps from direct viewing because the 2537 A. radiation which they produce is harmful to the eyes.

The lamps 6 may be of the generic type described in U.S. Patent No. 2,219,890 assigned to the assignee of this application and comprising a V-shaped coiled tungsten filament having electron emissive material such as alkaline earth oxide coated on its spaced ends. The spherical bulb, which as illustrated is of the size commonly designated S–11, contains argon at a low pressure and a small quantity of mercury. An electric discharge occurs between the spaced ends of the filament during operation of the lamp. Both 1849 A. and 2537 A. radiations are produced within the lamp but the lamp bulb consists of glass which transmits substantially only the 2537 A. and longer wave length radiation. However if it is desired to have a negative ion generator which at the same time produces a small quantity of ozone, one of the lamps, for instance 6a, may have a bulb consisting of glass which transmits a certain proportion of 1849 A. radiation. Lamp 6a might then be an ozone lamp of the four watt size generally designated OZ4S11.

In order to provide a renewable low work function metal target in accordance with the invention, a reservoir roll 12 of thin flexible aluminum foil 13 is stored in the housing 2 for use as a target material. It is inserted in place by removing the coverplate 10 and mounting it on the brackets 14. The axis of the roll lies parallel to the direction of air flow through the housing. The foil is pulled over and around guide rollers 15 so as to partly encircle the cluster of ultraviolet lamps and is drawn out through exit slot 16. A serrated springy shear bar 17 overlies the exit slot and serves both to retain the aluminum foil in place and to facilitate tearing off the length of used foil which has served its purpose as target material and is now being discarded. The foil is preferably maintained electrically connected to the housing, for instance through the rollers, and the housing is preferably suitably grounded.

The aluminum foil used in the air filter may be of the usual grade and thickness sold for domestic use as a foodstuff wrapping material. Preferably however an aluminum foil of superior cleanliness is used and one which has been degreased or treated to remove the exceedingly thin film of oil or lubricant which is found on much of the domestic grade foil. When a fresh strip of aluminum foil is drawn, the output of negative ions as measured by an electrometer located at the outlet aperture 9 is at a maximum. Over a period of hours, the negative ion output slowly drops. During this interval, the aluminum foil before the lamps loses its shine or luster and turns dull as it becomes coated with a relatively thick film of oxide. When a fresh strip of foil is drawn before the lamps, the full negative ion output is restored at a level severalfold higher.

Instead of a roll of aluminum foil from which a strip is periodically pulled off, a preformed disposable target 18 contoured for optimal effectiveness with the particular lamps selected for ultraviolet generation may be used as illustrated in FIG. 2. The preformed target may consist for instance of a stiff piece of cardboard 19 having an aluminum foil 20 on its front face. It is snapped into place between springy slips 21 fastened to coverplate 10. The target 18 is replaced periodically as the aluminum foil becomes coated with the film which causes it to lose its effectiveness.

FIGS. 3 and 4 illustrate another embodiment of the invention wherein the fresh target foil is advanced by a clockwork mechanism. Air purifier 23 comprises a housing along with an air blower, glass fiber filter, and outlet aperture similar to those previously described with reference to FIG. 1. The ultraviolet sources consist of a pair of elongated tubular discharge lamps 24 accommodated in lampholders 25. The lamps provide a low pressure discharge between spaced electrodes in mercury vapor. The lamps have envelopes of a glass transmissive to 2537 A. ultraviolet radiation and are of the kind generally known as germicidal lamps. A suitable lamp is commercially available under the designation G15T8 having an overall length of 15″, a diameter of 1″, and a consumption of 15 watts. The germicidal lamps in air purifier 23 obviously have a 2537 A. output many times greater than that of the lamps in air purifier 1.

A roll 26 of aluminum foil is supported within the housing on bearing brackets 27 and the sheet of foil 28 is drawn around guide rollers 29, 30 which maintain it at a suitable spacing from the lamps 24. The foil is rewound on drum roll 31 which is rotated slowly by a clockwork mechanism 32. Mechanism 32 may consist of a synchronous electric motor with a reduction gear train of the type commonly used in electric clocks. The aluminum foil is slowly unwound from the upper roll, passes around the lamp, and then is wound on the lower roll. Thus fresh clean foil is continually presented as a target to the ultraviolet lamps thereby maintaining the output of the negative ions at a high level. The used foil which is wound on the lower roll 31 has lost its luster due to the relatively thick film of oxide which is formed thereon. However it is still entirely suitable for domestic use. Also it is possible to clean and reprocess the used foil so as to make it available for further use as target material.

FIG. 5 illustrates a further embodiment of the invention wherein recycling of the target foil is used. In this arrangement 33, a plurality of rollers 34 are driven by a clockwork mechanism and carry an endless belt 35 provided with an aluminum surface. The belt may consist of a suitable flexible fabric or plastic backing with a layer of aluminum coated on the front. As the aluminum layer of the belt passes in front of the lamps, it serves as a target material. A motor driven buffing brush 36 engages the belt on its return pass and removes the surface oxide from the aluminum layer thereby reactivating the target material before the next exposure to ultraviolet energy. Such a system requires little attention for long periods of time while maintaining steady levels of negative ion output.

The specific embodiments of the invention which have been illustrated and described in detail are intended as exemplary and not as limitative of the invention whose scope is to be determined by the appended claims.

We claim:

1. A negative ion generator comprising an ultraviolet lamp producing 2537 A. radiation, a target surface of relatively low work function metal which oxidizes in air at an inntermediate rate, said target surface being located for irradiation by said lamp, means adapted to convenient replacement of said target surface as it becomes coated with a film inhibitive of electron emission, and means for blowing air across said target surface.

2. A negative ion generator comprising an ultraviolet lamp producing 2537 A. radiation, a target surface of one of the metals aluminum and magnesium having a relatively low work function, said target surface being located for irradiation by said lamp, means adapted to convenient replacement of said target surface as it becomes coated during use with a film inhibitive of electron emission, and means for blowing air across said target surface.

3. A negative ion generator comprising an ultraviolet lamp producing 2537 A. radiation, a target including a surface layer of alumina, means for locating said target surface in proximity to said lamp for irradiation by said 2537 A. radiation and facilitating convenient replacement of said target surface as it becomes coated with a film inhibitive of electron emission, and means for blowing air across said target surface.

4. A negative ion generator comprising an ultraviolet lamp producing 2537 A. radiation, means for providing a target surface of aluminum foil for irradiation by said lamp and for conveniently replacing said target surface as it becomes coated during use with a film inhibitive of electron emission, said means comprising a roll reservoir of aluminum foil, guide means for locating said foil before said lamp as it is drawn from said roll reservoir, means facilitating drawing fresh foil from said roll and tearing off used foil, and means for blowing air across said target surface.

5. A negative ion generator comprising an ultraviolet lamp producing 2537 A. radiation, means providing a target surface of aluminum foil for irradiation by said lamp and continuously renewing said target surface as it becomes coated during use with a film inhibitive of electron emission, said means comprising a roll reservoir of aluminum foil, guide means for locating said foil before said lamp as it is drawn from said roll reservoir, a drum for winding up said foil thereon after exposure to said radiation, a motor for driving said drum, and means for blowing air across said target surface.

6. A negative ion generator comprising an ultraviolet lamp producing 2537 A. radiation, means providing a target surface of aluminum for irradiation by said lamp and continuously renewing said target surface as it becomes coated during use with a film inhibitive of electron emission, said means comprising an endless flexible belt having a surface layer of aluminum thereon, drive means including guide rollers for causing said belt to pass continuously before said lamp, motor driven buffing means engaging said aluminum layer on said belt in order to remove said film therefrom, and means for blowing air across said target surface.

References Cited in the file of this patent

UNITED STATES PATENTS

| | | |
|---|---|---|
| 2,723,349 | Rylsky | Nov. 8, 1955 |
| 2,928,941 | Hicks et al. | Mar. 15, 1960 |

OTHER REFERENCES

Photocells and Their Application, Zworykin and Wilson; Second Edition, 1934; pages 4 to 8 relied upon.